March 24, 1925.

C. S. ANDERSEN 1,530,802

SOLDERING AND WELDING DEVICE

Filed June 28, 1924

3 Sheets-Sheet 1

C. S. Andersen, Inventor

March 24, 1925. 1,530,802
C. S. ANDERSEN
SOLDERING AND WELDING DEVICE
Filed June 28, 1924 3 Sheets-Sheet 2

C. S. Andersen, Inventor
By C A Snow & Co
Attorney

March 24, 1925.
C. S. ANDERSEN
1,530,802
SOLDERING AND WELDING DEVICE
Filed June 28, 1924    3 Sheets-Sheet 3
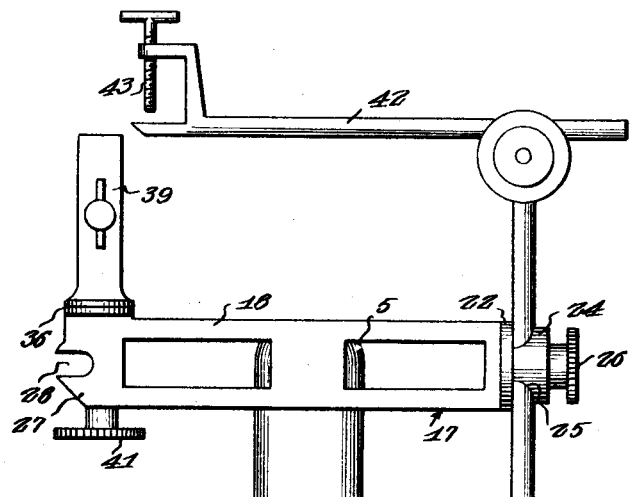
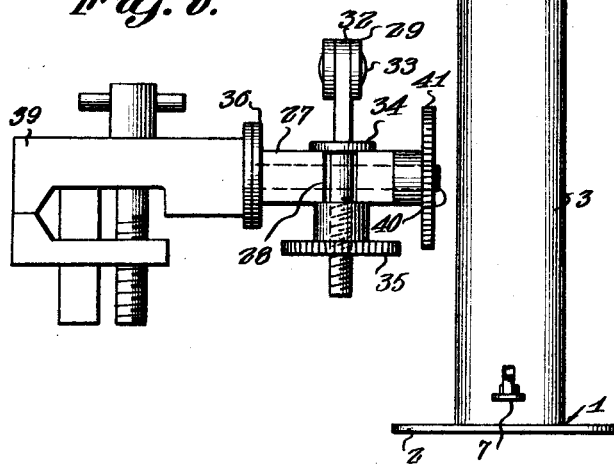
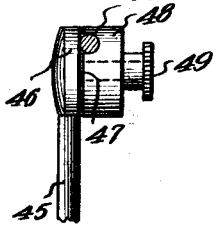
C. S. Andersen, Inventor
By ... Attorney Patented Mar. 24, 1925.

1,530,802

UNITED STATES PATENT OFFICE.

CHRISTIAN S. ANDERSEN, OF DWIGHT, ILLINOIS.

SOLDERING AND WELDING DEVICE.

Application filed June 28, 1924. Serial No. 722,964.

*To all whom it may concern:*

Be it known that I, CHRISTIAN S. ANDERSEN, a citizen of the United States, residing at Dwight, in the county of Livingston and State of Illinois, have invented a new and useful Soldering and Welding Device, of which the following is a specification.

This invention aims to provide novel means whereby a radiator or other work may be held during the operations of soldering or welding, novel means being provided for adapting the device to work of different sizes and shapes, and novel means being supplied for adjusting the work so that the operator may labor upon it conveniently.

It is within the province of the disclosure to improve generally and to enhance the utility of devices of that type to which the invention appertains.

Although preferred forms have been shown, it will be understood that a mechanic, working within the scope of what is claimed, may make changes and alterations without departing from the spirit of the invention.

Figure 1:
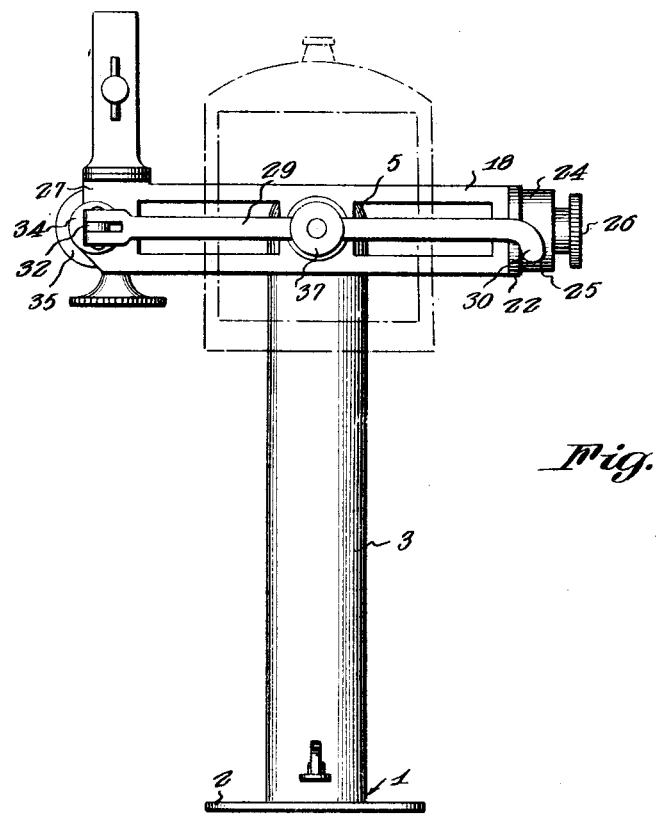
Figure 2:
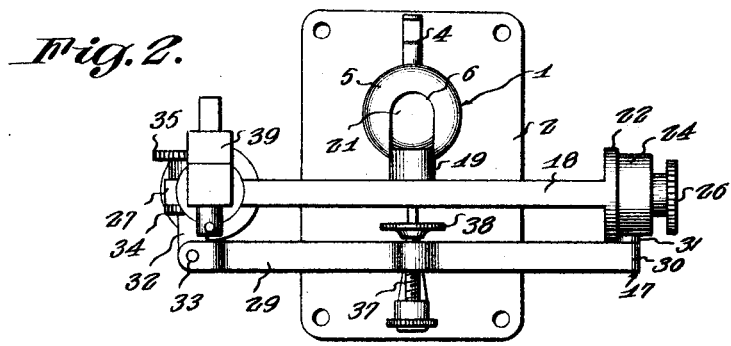
Figure 5:
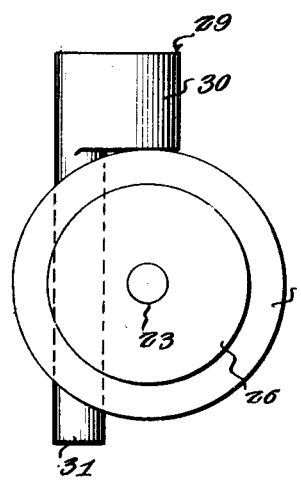
Figure 3:
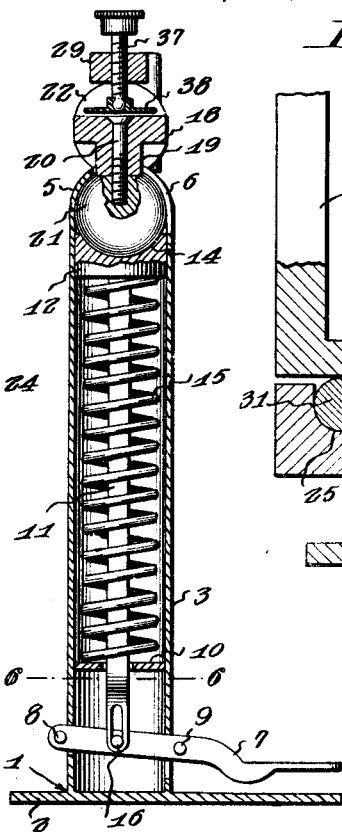
Figure 4:
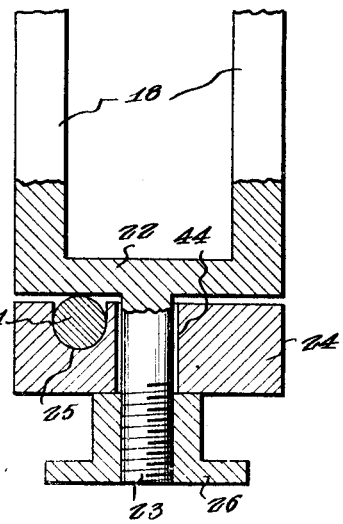
Figure 7:
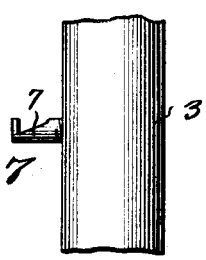
Figure 6:
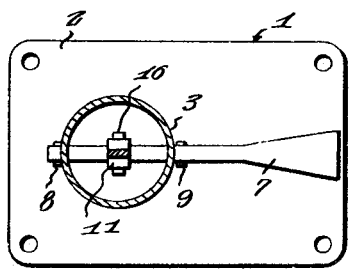

In the accompanying drawings:—Figure 1 shows, in front elevation, a device embodying the invention and set up for use in holding an automobile radiator; Figure 2 is a plan of the device shown in Figure 1; Figure 3 is a vertical longitudinal section taken through the support and attendant parts; Figure 4 is a fragmental elevation showing a portion of the main member of the work holder and elements associated therewith, parts being in section; Figure 5 is an end elevation of that portion of the machine which is shown in Figure 4; Figure 6 is a cross section on the line 6—6 of Figure 3; Figure 7 is a fragmental elevation showing a portion of the support and the hanger which the support carries; Figure 8 is an end elevation showing the work holder and attendant parts; Figure 9 is an elevation showing the device set up as it will appear when the operator wishes to solder or weld some element other than an automobile radiator; and Figure 10 is a sectional view illustrating a portion of the auxiliary member of the work holder used in Figure 9.

In carrying out the invention, there is provided a support 1 including a base plate 2 and a hollow pedestal 3 upstanding from the base plate, the pedestal being provided with an outstanding hanger 4 adapted to support a pot of solder or flux (not shown). The pedestal 3 has a rounded upper end 5, a slot 6 being located in the end 5 of the pedestal and extending from the axis (Figure 2) of the pedestal downwardly into the side (Figure 3) of the pedestal.

A pedal 7 extends through the lower end of the pedestal 3 and is fulcrumed at one end, as at 8, on the pedestal, the pedal carrying a transverse stop 9 (Figures 3 and 6) which, coacting with the pedestal 3, limits the downward swinging movement of the pedal. An abutment 10 is secured within the pedestal 3.

A plunger is mounted for reciprocation in the pedestal 3, and includes a stem 11 slidable in the abutment 10, and a head 12 on the stem, the head fitting closely but slidably in the pedestal 3. In its upper surface, the head 12 of the plunger is equipped with a concaved seat 14, complemental to the rounded end 5 of the pedestal 3. A compression spring 15 is located within the pedestal 3, about the stem 11 of the plunger, one end of the spring engaging the abutment 10, and the other end of the spring engaging the head 12 of the plunger. The lower end of the stem 11 of the plunger is pivotally connected at 16 with the intermediate portion of the pedal 7.

The device comprises a work holder 17, mounted to rock on the upper end of the pedestal 3. The work holder 17 is a composite structure, and includes a main member 18, equipped intermediate its ends with a rearwardly extended arm 19 (Figure 2) mounted to move in the slot 6 which is fashioned in the rounded end 5 of the pedestal 3, the main member of the work holder being connected by a securing element 20 (Figure 3) with a ball 21, held on the arm 19, and mounted to rock in the rounded end 5 of the pedestal 3, the ball being received in the seat 14 which is fashioned in the head 12 of the plunger.

It will be obvious that by pressing down the pedal 7, compressing the spring 15 and retracting the plunger 11—12, the ball 21 is released, so that the work holder 17 may be swung from the position of Figure 1, in front of the pedestal 3, to the position shown in Figure 3, above the pedestal, it being possible to retain the work holder in any position between the limits of its movement, by relieving the pressure on the pedal 7 and permitting the head 12 of the plunger to engage the ball 21, under the action of the spring 15.

The main member 18 of the work holder is provided at one end with a disk-like (Figure 3) head 22 disposed at right angles (Figure 2) to the length of the main member 18. The head 22 has a stem 23 (Figure 4) whereon a clamping disk 24 is journaled for adjustment, a seat or notch 25 being fashioned in the inner surface of the disk 24, at one side of the opening 44 in the disk, through which the stem 23 passes. A nut 26 is threaded on the stem 23 and cooperates with the clamping disk 24. The main member of the work holder terminates in a head 36, disposed in a common plane with the work holder, as shown in Figure 9, the head having a notch 28 disposed in the end of the work holder. The head 27 carries an enlarged abutment plate 36 located at one side of the main member 18 of the work holder.

The auxiliary member 29 of the work holders 17 is in the form of a bar, adapted to be disposed in parallelism with the main member 18, the auxiliary member having an offset end 30 (Figure 1) carrying a transverse finger 31 (Figs. 4 and 5), the finger being received in the seat 25 of the clamping disk 24. The reason for providing the auxiliary member 29 with the offset end 30 is to permit the member 29 to be disposed midway between the upper and lower edges of the main member 18, as in Figure 1, it being recalled that the seat 25 which receives the finger 31 is not disposed in the axis of the main member 18 of the work holder, as Figure 4 will show. The finger 31 of the auxiliary member 29 may be moved endwise in the seat 25. This operation permits a change in the space between the parts 29 and 18, and permits radiators or other objects of different thicknesses to be held between the parts 18 and 29. The finger 31 can rotate in the seat 25, and, therefore, the auxiliary member 29 may be swung downwardly from the position of Figure 1, when the device is not in use. Reverting to Figure 4, it will be clear that by advancing the nut 26 on the stem 23, the finger 31 of the auxiliary member 29 may be bound against the head 22 of the main member 18 of the work holder 17, thereby holding the auxiliary member 29 in any position to which it may have been adjusted.

That end of the auxiliary member 29 which is remote from the clamping disk 24 is pivoted at 33 to a transverse arm 32 adapted to be received in the notch 28 which exists in one end of the main member 18 of the work holder 17. The arm 32 has an abutment 34 which may engage one side of the head 27 of the member 18, a nut 35 being threaded on the arm, and the nut being adapted to engage the opposite side of the head 27, as shown in Figure 2. A clamp screw 37 is threaded in the intermediate portion of the auxiliary member 29 of the work holder and is equipped at its inner end with a swiveled foot 38 (Figure 3).

The device as thus far described, is adapted to hold an automobile radiator, shown in dotted lines in Figure 1, the radiator abutting against the main member 28 of the work holder, and being engaged by the foot 38 of the clamp screw 37. Since the finger 31 is movable for adjustment longitudinally in the seat 25 of the clamping disk 24, and since the pivoted arm 32 carries the nut 35, it is obvious that radiators of different thicknesses may be held during the performance of work thereon, it being possible to dispose the radiator at any angle between a horizontal position and a vertical position, owing to the provision of the ball 21, the slot 6, and attendant parts depicted in Figure 3.

The numeral 39 designates a vise abutting at one end against the member 36 of the head 27 of the main member 18 of the work holder, and including a stem 40, journaled for adjustment in the head 27, and held in adjusted position by a nut 41, threaded on the stem and adapted to engage the head 27. The vise is disposed approximately at right angles to the main member of the work holder and is adjustable about an axis represented by the stem 40.

In the event that the operator is not working upon a radiator, the machine may be arranged as in Figure 9, under which circumstances, the auxiliary member 29 and parts associated therewith are removed, recourse being had to an auxiliary member 42 provided at one end with a clamp 43 which may be used either alone, or in conjunction with the vise 39, for retaining parts which are to be soldered or welded. The finger of the auxiliary member 42, corresponding to the finger 31 of the auxiliary member 29, is in the form of a rod 45, adapted to be received in the seat 25 of the clamping disk 24, the rod or finger 45 having a terminal enlargement 46, carrying a stem 47 whereon a clamping disk 48 is rotatable for adjustment, a nut 49 being threaded on the stem and being adapted to cooperate with the clamping disk 48, the disk being provided in its inner surface with a seat or notch 50, wherein the auxiliary member 42 is adjustable both by rotation and by longitudinal movement, thereby to position the clamp 43 as the operator may wish.

Having thus described the invention, what is claimed is:—

1. In a device of the class described, a support, a work holder disposed transversely of the support and comprising a main member, means for connecting the main member with the support to permit the work holder to swing from a position above the support to a position at one side of the support, a clamp rotatable for adjustment on one end of the main member, means for holding the clamp in adjusted positions, the work holder comprising an auxiliary member adapted to be disposed approximately parallel to the main member, the auxiliary member having an angularly disposed finger which is rotatably adjustable, and adjustable end-wise, between the clamp and the main member.

2. A device of the class described, constructed as set forth in claim 1, and further characterized by a work retainer on the auxiliary member, a work retainer axially adjustable on the main member and cooperating with the first-specified work retainer, and means for holding the last-specified work retainer in any position to which it may have been adjusted axially.

3. A device of the class described, constructed as set forth in claim 1, and further characterized by the fact that the auxiliary member is mounted to swing on the finger, for adjustment in a plane parallel to the finger, the auxiliary member being axially rotatable on the finger, and being movable endwise on the finger, for adjustment, and a single means for holding the auxiliary member and the finger in any of the adjusted positions specified.

In testimony that I claim the foregoing as my own, I have hereto affixed my signature in the presence of two witnesses.

CHRISTIAN S. ANDERSEN.

Witnesses:
JOHN J. DOHERTY,
GEORGE T. DONIGAN.